(12) United States Patent
Kabeya et al.

(10) Patent No.: US 10,679,002 B2
(45) Date of Patent: Jun. 9, 2020

(54) TEXT ANALYSIS OF NARRATIVE DOCUMENTS

(71) Applicant: International Business Machines Corporation, Armonk, NY (US)

(72) Inventors: Yoshinori Kabeya, Kawasaki (JP); Emiko Takeuchi, Tokyo (JP); Hirobumi Toyoshima, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 15/487,034

(22) Filed: Apr. 13, 2017

(65) Prior Publication Data

US 2018/0300308 A1 Oct. 18, 2018

(51) Int. Cl.
*G06F 40/211* (2020.01)
*G06T 11/20* (2006.01)
*G06F 40/289* (2020.01)

(52) U.S. Cl.
CPC ......... *G06F 40/211* (2020.01); *G06F 40/289* (2020.01); *G06T 11/206* (2013.01)

(58) Field of Classification Search
None
See application file for complete search history.

(56) References Cited

U.S. PATENT DOCUMENTS

| | | | | |
|---|---|---|---|---|
| 6,711,577 B1 * | 3/2004 | Wong | ...................... | G06F 16/26 707/694 |
| 7,539,677 B1 * | 5/2009 | Wong | .................... | G06F 16/904 |
| 7,949,617 B1 * | 5/2011 | Higgins | ................... | G06N 5/04 706/11 |
| 9,110,977 B1 * | 8/2015 | Pierre | .................... | G06F 40/211 |
| 9,864,837 B2 * | 1/2018 | Carroll | ................... | G16H 50/30 |
| 2001/0049678 A1 * | 12/2001 | Yaginuma | ............. | G06F 16/283 |
| 2003/0187592 A1 * | 10/2003 | Ohta | ...................... | G16B 45/00 702/20 |
| 2007/0118542 A1 * | 5/2007 | Sweeney | ................. | G06F 16/35 |

(Continued)

FOREIGN PATENT DOCUMENTS

JP 2006244018 A 9/2006

OTHER PUBLICATIONS

Wozelka (Wozelka, Ralph, Mark Kröll, and Vedran Sabol. "Exploring Time Relations in Semantic Graphs." Proceedings of SIGRAD 2015, Jun. 1st and 2nd, Stockholm, Sweden. No. 120. Linköping University Electronic Press, 2015.).*

(Continued)

*Primary Examiner* — Jonathan C Kim
(74) *Attorney, Agent, or Firm* — Cuenot, Forsythe & Kim, LLC

(57) ABSTRACT

A system including: a text analyzing unit extracting keywords as predetermined facets from text of a document to define a time sequence of a part of the text between the keywords and sort words included in the part into time axes, the time axes being divisions of the time sequence; and a drawing unit drawing a chart in a drawing space, the chart including nodes and an edge, the nodes corresponding to the facets, the nodes being arranged in the drawing space in accordance with a relationship of the time sequence between the facets, the edge being linked to the nodes in accordance with a connection between the facets.

20 Claims, 9 Drawing Sheets

(56) References Cited

U.S. PATENT DOCUMENTS

| | | | | |
|---|---|---|---|---|
| 2007/0136221 | A1* | 6/2007 | Sweeney | G06N 5/02 706/20 |
| 2009/0070295 | A1* | 3/2009 | Otomori | G06F 40/14 |
| 2010/0049538 | A1* | 2/2010 | Frazer | G06Q 30/02 705/14.4 |
| 2010/0077001 | A1* | 3/2010 | Vogel | G06F 16/353 707/777 |
| 2010/0199167 | A1* | 8/2010 | Uematsu | G06F 40/166 715/234 |
| 2010/0312769 | A1* | 12/2010 | Bailey | G06F 16/95 707/740 |
| 2011/0047159 | A1* | 2/2011 | Baid | G06F 16/355 707/738 |
| 2012/0011475 | A1* | 1/2012 | Hontz, Jr. | G06F 3/0483 715/854 |
| 2012/0054226 | A1* | 3/2012 | Cao | G06F 16/34 707/769 |
| 2012/0137367 | A1* | 5/2012 | Dupont | G06F 21/00 726/25 |
| 2012/0215523 | A1 | 8/2012 | Inagaki | |
| 2012/0290988 | A1* | 11/2012 | Sun | G06F 16/26 715/853 |
| 2012/0303611 | A1* | 11/2012 | Kusumura | G06F 16/355 707/722 |
| 2012/0323899 | A1* | 12/2012 | Ilyas | G06F 16/24578 707/723 |
| 2013/0060785 | A1* | 3/2013 | Sweeney | G06N 5/00 707/748 |
| 2013/0103719 | A1* | 4/2013 | Gotz | G06T 11/206 707/798 |
| 2013/0293551 | A1* | 11/2013 | Erez | G06T 11/206 345/440 |
| 2013/0298038 | A1* | 11/2013 | Spivack | H04L 65/403 715/753 |
| 2013/0311471 | A1 | 11/2013 | Okajima et al. | |
| 2014/0160134 | A1* | 6/2014 | Bekmambetov | G06F 40/40 345/473 |
| 2014/0172417 | A1* | 6/2014 | Monk, II | G06F 40/30 704/9 |
| 2014/0244295 | A1* | 8/2014 | Carroll | G16H 50/30 705/3 |
| 2015/0032746 | A1* | 1/2015 | Lev-Tov | G06F 16/243 707/737 |
| 2016/0061625 | A1 | 3/2016 | Wang | |
| 2016/0063212 | A1* | 3/2016 | Monier | G16H 10/60 705/3 |
| 2016/0267086 | A1* | 9/2016 | Liden | G06F 16/285 |
| 2017/0004129 | A1* | 1/2017 | Shalaby | G06F 16/367 |
| 2017/0235848 | A1* | 8/2017 | Van Dusen | G06Q 50/01 705/12 |

OTHER PUBLICATIONS

Itoh (Itoh, Masahiko, et al. "Analysis and visualization of temporal changes in bloggers' activities and interests." Visualization Symposium (PacificVis), 2012 IEEE Pacific. IEEE, 2012.).*

Wozelka, Ralph, Mark Kröll, and Vedran Sabol. "Exploring Time Relations in Semantic Graphs." Proceedings of SIGRAD 2015, Jun. 1st and 2nd, Stockholm, Sweden. No. 120. Linköping University Electronic Press, 2015. (Year: 2015).*

Cao, Nan, et al. "Facetatlas: Multifaceted visualization for rich text corpora." IEEE transactions on visualization and computer graphics 16.6 (2010): 1172-1181. (Year: 2010).*

Ma, Xiao, Jay Bal, and Ahmad Issa. "A fast and economic ontology engineering approach towards improving capability matching: Application to an online engineering collaborative platform." Computers in Industry 65.9 (2014): 1264-1275. (Year: 2014).*

Tao, Cui, et al. "Towards event sequence representation, reasoning and visualization for EHR data." Proceedings of the 2nd ACM SIGHIT International Health Informatics Symposium. ACM, 2012. (Year: 2012).*

* cited by examiner

FIG.3

| document ID | Time axis 1 | Time axis 2 | Time axis 3 | Time axis 4 |
|---|---|---|---|---|
| 1 | get the notice in East area command the field survey | driver Investigate in inbound line is not abnormal | arrive at the spot in the center of East area Start the Investigation | rail crack find |
| 2 | in South area command the survey investigator carry out survey | The point of insulation rail bond is not abnormal track maintenance equipment is not abnormal | In East South area At Acklington station ... re-investigation broken rail | |
| ... | ... | ... | ... | ... |

Time sequence →

TEXT ANALYSIS OF NARRATIVE DOCUMENTS

BACKGROUND

The present invention relates to text analysis of narrative documents.

Recently, various techniques have been known regarding text analysis.

SUMMARY

According to an embodiment of the present invention, there is provided a system including a text analyzing unit and a drawing unit. The text analyzing unit extracts keywords as predetermined facets from text of a document to define a time sequence of a part of the text between the keywords and sort words included in the part into time axes. The time axes are divisions of the time sequence. The drawing unit draws a chart in a drawing space. The chart includes nodes and an edge. The nodes correspond to the facets. The nodes are arranged in the drawing space in accordance with a relationship of the time sequence between the facets. The edge is linked to the nodes in accordance with a connection between the facets.

According to another embodiment of the present invention, there is provided a computer-implemented method. The method obtains information on words extracted from text of plural documents. The words include keywords to be extracted as predetermined facets. The words are sorted into time axes by each document. The time axes are divisions of a time sequence of the text between the keywords. The method obtains information on confidences of sequence rules of the plural documents. Each of the sequence rules is constituted by at least sequences of the words. The method draws a chart in a drawing space. The chart includes nodes and an edge. The nodes correspond to the facets. The nodes are arranged in the drawing space in accordance with a relationship of the time sequence between the facets. The edge is linked to the nodes in accordance with a relationship of the time sequence between the facets and the information on the confidences.

According to still another embodiment of the present invention, there is provided a computer program product including a computer readable storage medium having program instructions embodied with the computer readable storage medium. The program instructions are executable by a computer to cause the computer to obtain information on words extracted from text of plural documents. The words include keywords to be extracted as predetermined facets. The words are sorted into time axes by each document. The time axes are divisions of a time sequence of the text between the keywords. The program instructions are executable by a computer to further cause the computer to obtain information on confidences of sequence rules of the plural documents. Each of the sequence rules is constituted by at least sequences of the words. The program instructions are executable by a computer to further cause the computer to draw a chart in a drawing space. The chart includes nodes and an edge. The nodes correspond to the facets. The nodes are arranged in the drawing space in accordance with a relationship of the time sequence between the facets. The edge is linked to the nodes in accordance with a relationship of the time sequence between the facets and the information on the confidences.

BRIEF DESCRIPTION OF THE DRAWINGS

FIG. 3 is an example of data stored in the first result storage unit.

DETAILED DESCRIPTION

Hereinafter, exemplary embodiments of the present invention will be described in detail with reference to the attached drawings.

It is to be noted that the present invention is not limited to these exemplary embodiments given below and may be implemented with various modifications within the scope of the present invention. In addition, the drawings used herein are for purposes of illustration, and may not show actual dimensions.

Existing text analysis engines are designed to carry out analysis on the basis of part-of-speech decomposition and the numbers of extraction of individual words. As a result, when a narrative document such as a report is subjected to the analysis, the context of the appearing terms is lost. In the case of a document such as a report, information on the order of the word appearance may bring technical advantages.

Figure 1:
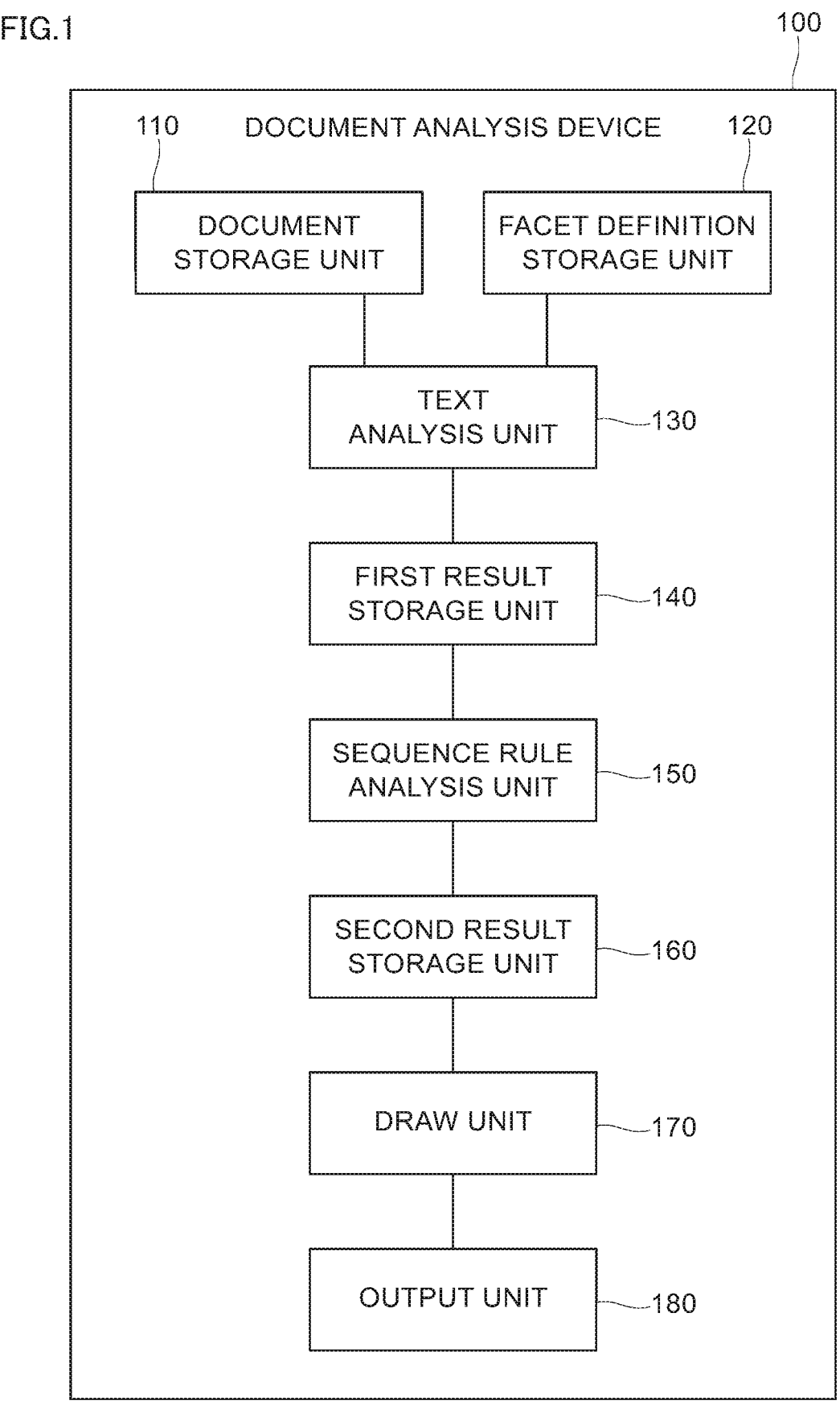
FIG. 1 is a block diagram of a document analysis device according to an embodiment of the present invention.

FIG. 1 is a block diagram of a document analysis device 100 according to an embodiment of the present invention. As shown in FIG. 1, the document analysis device 100 may include a document storage unit 110, a facet definition storage unit 120, a text analysis unit 130, a first result storage unit 140, a sequence rule analysis unit 150, a second result storage unit 160, a draw unit 170, and an output unit 180. Note that the text analysis unit 130 is an example of a text analyzing unit, the sequence rule analysis unit 150 is an example of a sequence rule analyzing unit, and the draw unit 170 is an example of a drawing unit.

The document storage unit 110 stores documents that are subjected to analysis by the document analysis device 100 (hereinafter referred to as "subject documents"). The document storage unit 110 may be a magnetic disk memory device or a semiconductor memory device.

The subject documents may be written in a natural language. The subject documents may be narrative documents such as a report, a journal, and an instruction. Note that the subject documents may consist of a single document.

The subject documents may include description of events that have occurred in a certain time period. Such description generally includes time information relating to the events, so that contents of the subject documents are generally described along the time sequence. For example, assume that an accident report of a railroad is created (written) by a person in a railroad company who is in charge of a maintenance and inspection site. Such accident report is typically written in a narrative form, and may include detailed description of the accident, such as its causes, solutions, restoration time and the like, which are arranged in a time series manner.

The facet definition storage unit 120 stores definitions of facets. The facet definition storage unit 120 may be a magnetic disk memory device or a semiconductor memory device.

In this specification, the term "facet" will be used to refer to a concept for analyzing the subject documents. The facet may be defined for an event appearing in common in the individual subject documents. Each facet may be expressed in the form of a keyword, and used as a basis for analysis. The facets may be set according to attributes of the subject documents for purposes of the analysis. In the above example of the report on the railroad accident, the facets may be defined as to the following: a matter at the time when the accident has occurred (hereinafter referred to as a "subject matter facet"), a cause(s) of the accident that has been identified (hereinafter referred to as a "cause facet"), and a solution(s) that has been implemented subsequently (hereinafter referred to as a "solution facet").

The facets are typically predetermined by a user of the document analysis device 100. Alternatively, the facets may be set mechanically or may be changed based on the analysis results obtained by the text analysis unit 130 (described later).

The text analysis unit 130 analyzes the subject documents read from the document storage unit 110. The text analysis unit 130 may perform analysis processes such as a morpheme analysis, a syntax analysis, a semantic analysis, or a facet analysis of the subject documents. The text analysis unit 130 extracts words (keywords) defined as facets, and associates them with other words (e.g. a part of the subject documents or a part of a speech) or with other facets. More specifically, the text analysis unit 130 determines whether other words or other facets appear before or after the keywords so that the text analysis unit 130 associates the keywords with the other words or with the other facets according to their determined positions. Note that a "keyword" as used herein may consist of multiple words.

The text analysis unit 130 also determines (defines) a time sequence of the text (words or sentences) between the facets. As mentioned above, narrative documents such as a report may be written in a time series manner. Thus, the text analysis unit 130 can determine the time sequence of the text based on words indicating time or actions. Further, the text analysis unit 130 can divide the time sequence of the text into time axes, based on the verb or the adjective which appears first in each sentence, for example. Here, the "time axes" refer to relative timings in the time sequence.

The dividing points of the time sequence are not limited to the first verb or the first adjective in the sentence; the methodology of division of the time sequence can be flexibly modified by settings (alternatives: demarcation by a sentence plus a word indicating time, and the like). In other words, any method for dividing the time sequence may be applicable as long as the method is capable of determining the time sequence of actions included in the text. For example, if the subject documents are written in Japanese, the text analysis unit 130 can divide the time sequence of the text into time axes in units of verb or adjective which is not followed by any verb. Such verb or adjective may occur at the end of each sentence in the Japanese text. As another example, the text analysis unit 130 can divide the time sequence by every sentence. As still another example, the text analysis unit 130 can divide the time sequence based on words indicating time, e.g. 20:35 or the next day.

Figure 2:
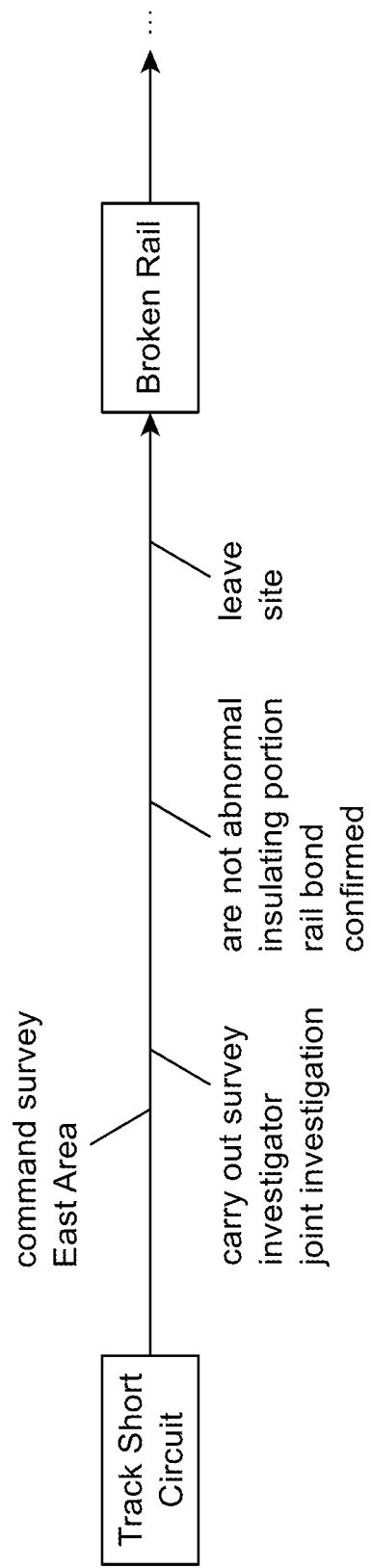
FIG. 2 is an example of setting the time sequence of the text between the facets by the text analysis unit.

FIG. 2 is an example of setting the time sequence of the text between the facets by the text analysis unit 130. Hereinafter, an example of setting the time sequence of the text between the facets will be described in detail. In this example, the text analysis unit 130 analyzes the following text example to extract the facets and sets the time sequence of the text between the extracted facets. The following text example is a report on a railroad accident. Several facets including the subject matter facet, the cause facet and the solution facet are assumed to be extracted from the following text example.

Text example: At 16:40 of the previous day, 18th, the direction center informed us of an occurrence of a track short circuit somewhere in the railroad interval between Alnmouth station and Newcastle station in the Red line, in response to which we commanded the East area to carry out the survey. As a result of the joint investigation, they confirmed, at 20:20 with investigators that the insulating portion and the rail bond are not abnormal and accordingly the facilities of the track maintenance side are not abnormal, and they left the site at 20:35. On the next day, as the East area carried out re-investigation of the railroad between Cheseter-le-street station and Newcastle station, they found a broken portion (transverse) in the left rail in the 12th railroad crossing near the 10k319m point.

In the above text example, the text analysis unit 130 first extracts the keyword "track short circuit" as the subject matter facet based on the words "track short circuit". The text analysis unit 130 also extracts the keyword "broken rail" as the cause facet based on the words "broken rail". The text analysis unit 130 then sets the time sequence of actions (items) included in the text example based on the sequence of the verbs appearing in the text example such as the verbs "informed", "commanded", and "found", the words representing the elapsed time such as "result of" and "next day", and the words representing the time such as "20:20" and "20:35". Note that the sequence of the verbs appearing in the text example is an example of an appearance order of verbs. The text analysis unit 130 then links the subject matter facet with the cause facet, which appears after the subject matter facet in the text. The text analysis unit 130 then links the words appearing between the subject matter facet and the cause facet with these facets based on the result of setting the time sequence of the items.

As shown in FIG. 2, the subject matter facet "Track Short Circuit" and the cause facet "Broken Rail" are linked with each other (shown as an arrow). The words appearing between the two facets are linked with them based on the time sequence (shown as branches of the arrow). In the shown example, the words appearing between the two facets are the following: the first group of the words "command survey" and "East Area", the second group of the words "carry out survey", "investigator", and "joint investigation", the third group of the words "are not abnormal", "insulating portion", "rail bond", and "confirmed", and the fourth group of the words "leave" and "site". The text analysis unit 130 determines the time sequence of the items and associates them with the facets in the individual subject documents to store these results in the first result storage unit 140.

Note that some words extracted as the facets from the text may be required to be handled as a single facet even if the words are expressed differently. In the present embodiment, these variations of the words, i.e., synonyms, may be extracted as the same facet regardless of a difference of expression.

For example, the keyword "Broken Rail" is assumed to be extracted as the cause facet from the above accident report. The accident, i.e., the subject matter may be "Track Short Circuit", which is caused by "Broken Rail". The solution for the accident caused by "Broken Rail" may be "Attachment of joint board" or "Attachment of rail bond". Further, similar events which can be causes of the same accident and to which the same solution can applied may be "Rail crack" and "Rail breakage". In this example, "Broken rail", "Rail crack", and "Rail breakage" can be extracted as the same cause facet, which can be labeled as "Broken Rail" facet, for example. A group of words to be extracted as the same facet may be determined according to the attributes of the subject documents or the purposes of the analysis, similarly to the definition of the facets.

The first result storage unit 140 stores the above-mentioned analysis results obtained by the text analysis unit 130 with document IDs for identifying the subject documents. The first result storage unit 140 may be a magnetic disk memory device or a semiconductor memory device.

FIG. 3 is an example of data stored in the first result storage unit 140.

As shown in FIG. 3, the words extracted as a result of analysis of the subject documents are sorted by document ID and time axis. Note that targets for extraction may be combinations of adjective+noun, verb+noun (object), and noun (excluding words that exist in common in all documents). Adverb or adverbial just after combination of verb+noun (object) may be sorted into the same group. Further, each keyword extracted as a facet may also be sorted into the corresponding time axis to which the sentence including that keyword belongs.

For example, the words included in document ID 1 are sorted into time axis 1, time axis 2, time axis 3, and time axis 4. In time axis 1, words "get the notice", "in East area", and "command the field survey" are stored. In time axis 2, words "driver", "Investigate", "in inbound line", and "is not abnormal" are stored. In time axis 3, words "arrive at the spot", "in the center of East area", and "Start the investigation" are stored. In time axis 4, words "rail crack" and "find" are stored. The words included in document ID 2 are similarly sorted into time axes 1 to 3, with the words stored in corresponding columns. As explained above, time axes 1 to 4 respectively represent different relative timings in each subject document, indicating the time sequence (context) of the events described in each subject document. Accordingly, time axis 1 of document ID 1 may not represent the same timing (time) as time axis 1 of document ID 2, for example. Actual elapsed time in each subject document is determined based on the sequence of verbs in each time axis.

The data of the analysis results may be corrected if required. For example, the words appearing in all subject documents may be excluded from subjects of analysis processes by the sequence rule analysis unit 150 (described later). Further, words recognized as synonymous words by the semantic analysis or the concept analysis may be handled as a single group of words, i.e., a single facet, regardless of difference in expression.

The sequence rule analysis unit 150 generates sequences by combining groups of words over different time axes in each subject document. The sequence rule analysis unit 150 calculates characteristics of sequence rules based on the sequences. In the present embodiment, the sequence rule analysis unit 150 calculates supports and confidences as the characteristics of the sequence rules.

In this specification, the term "sequence" will be used to refer to a data row of items (words) included in each of the time axes aligned along the time sequence. Note that one sequence consists of one or more items (words).

For example, referring to document ID 1 shown in FIG. 3, the item "commanded the field survey" is stored in time axis 1.

The sequences including the item "commanded the field survey" may be generated as follows:
sequence S1: "commanded the field survey";
sequence S2: "commanded the field survey"→"driver";
sequence S3: "commanded the field survey"→"arrive at the spot";
sequence S4: "commanded the field survey"→"driver"→"arrive at the spot";
sequence S5: "commanded the field survey"→"rail crack";
sequence S6: "commanded the field survey"→"driver"→"rail crack";
sequence S7: "commanded the field survey"→"arrive at the spot"→"rail crack";
sequence S8: "commanded the field survey"→"driver"→"arrive at the spot"→"rail crack".

Sequence S1 consists of the item of time axis 1. Sequence S2 consists of the items of time axes 1 and 2. Sequence S3 consists of the items of time axes 1 and 3. Sequence S4 consists of the items of time axes 1, 2, and 3. Sequence S5 consists of the items of time axes 1 and 4. Sequence S6 consists of the items of time axes 1, 2, and 4. Sequence S7 consists of the items of time axes 1, 3, and 4. Sequence S8 consists of the items of time axes 1, 2, 3, and 4. With respect to each of the items included in time axes 1, 2, 3, and 4 of document ID 1, the sequences are generated. Each of the generated sequences includes one to four items stored in time axes 1, 2, 3, and 4. In this manner, sequences are generated to cover all combinations of the items respectively stored in time axes 1, 2, 3 and 4.

In this specification, the term "sequence rule" will be used to refer to a rule that if one sequence appears, then another sequence appears. For example, as to the above sequences 51 and S2, the sequence rule is that if sequence S1 appears, then sequence rule S2 appears. The sequence rules may be set by combining the above sequences.

The support of a sequence rule can be expressed as:

Support=$Nu/Tn$, where Nu is the number of the subject documents containing the corresponding sequence, and Tn is the total number of the subject documents. In other words, the support of the sequence rule can be a ratio of the number of the subject documents containing the corresponding sequence to the total number of the subject documents.

The confidence of the sequence rule that if sequence A appears, then sequence B appears can be expressed as:

Confidence=support of sequence rule($A \rightarrow B$)/support of $A$ where support of sequence rule ($A \rightarrow B$) is the support of the corresponding sequence rule that if sequence A appears, then sequence B appears, and support of A is the support of sequence A. In other words, the confidence of the sequence rule can be a ratio of the support of the subject documents containing sequence A and sequence B to the support of the subject documents containing sequence A.

Any existing method such as Apriori algorithm may be applicable to the above calculation of the characteristics of the sequence rules for optimization. For example, assume that a threshold of the support is set in advance. If the support of a sequence only consisting of a single group of words (i.e., a single item) does not reach the threshold, such sequence and other sequences including the single group of words may be omitted from calculation. This can reduce the number of processing objects.

As another example, if the support of a sequence exceeds the threshold, the calculation of the confidence of sequence rules including the exceeding sequence may be carried out. In other words, as to the subject documents and the words appearing in the subject documents such as those shown in FIG. 3, the calculation of the confidence may be carried out only for the combinations of sequences each having a degree of support equal to or higher than the threshold. To calculate only the confidence of the sequence rules including the sequence exceeding the threshold can reduce the number of objects subjected to the calculation of the confidence.

Note that a sequence rule or sequence rules are created on per-document basis based on the time axes, and the support and the confidence of each sequence rule are calculated.

The second result storage unit 160 stores the above mentioned analysis results performed by the sequence rule analysis unit 150, along with the document IDs for the subject documents. The second result storage unit 160 may be a magnetic disk memory device or a semiconductor memory device.

The draw unit 170 draws graphs (charts) representing a relationship among the facets of the events and the sequence rules, based on the analysis results on per-document basis performed by the sequence rule analysis unit 150 and stored in the second result storage unit 160.

Figure 4:
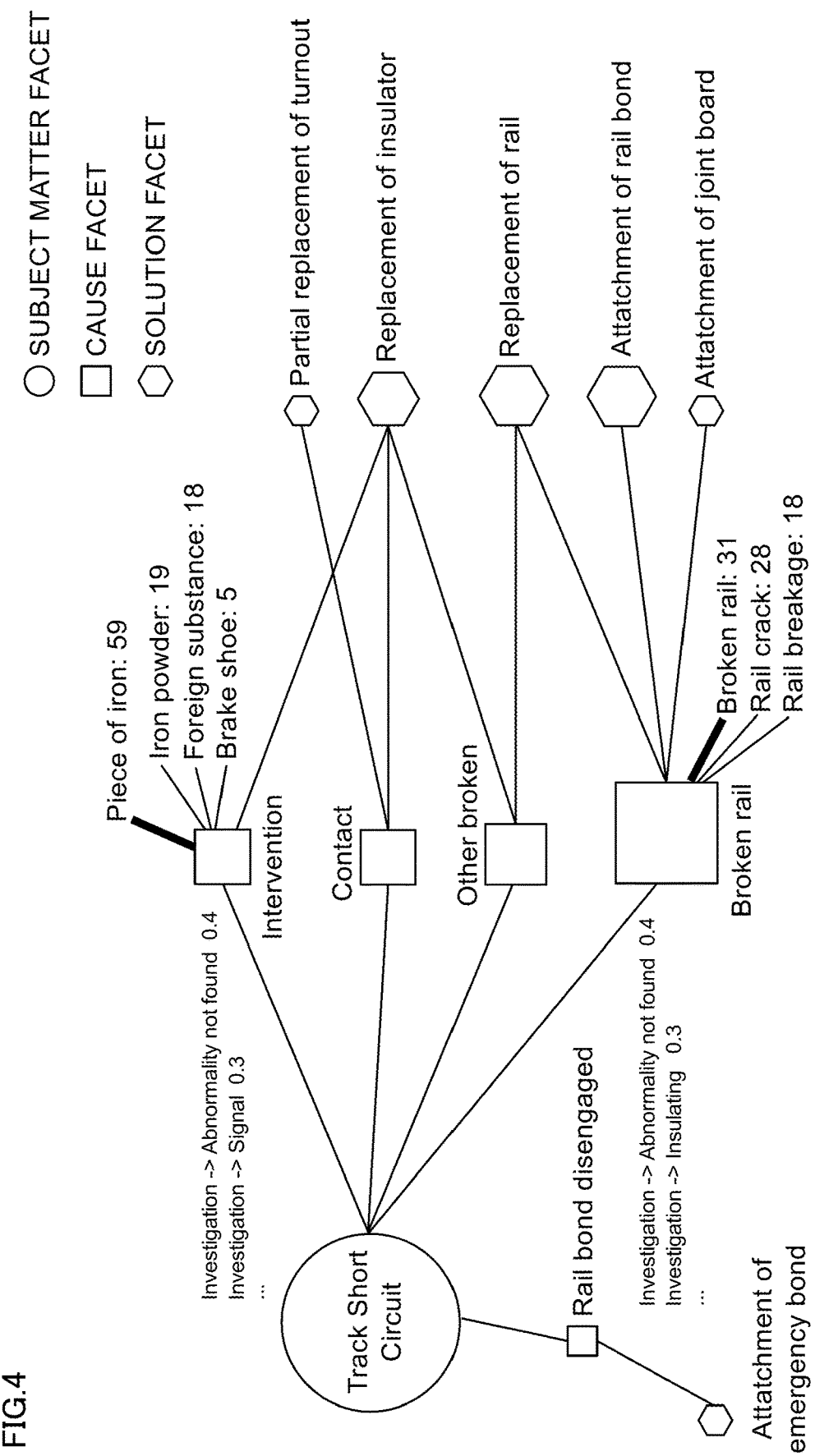
FIG. 4 is an example of a graph drawn by the draw unit.

FIG. 4 is an example of a graph drawn by the draw unit 170. The graph (chart) shown in FIG. 4 includes multiple nodes and edges. The nodes represent the facets. The nodes shown in FIG. 4 includes a node representing the subject matter facet (hereinafter referred to as a "subject matter node"), nodes representing the cause facets (hereinafter referred to as "cause nodes"), and nodes representing the solution facets (hereinafter referred to as "solution nodes"). The size of each node represents the number of appearances of each facet. The edges connecting the nodes represent a relationship (connection) of the corresponding facets. The relationship is based on the analysis results obtained by the text analysis unit 130 regarding the linkage between the facets.

For generating the graph, the draw unit 170 first puts the nodes of the facets in a drawing space where the graph is drawn. The positions of the nodes are not limited. The nodes may be arranged based on appropriate rules to make the nodes easily visible or understandable. For example, the nodes may be arranged in a specific (certain) direction based on the time sequence of the facets. In the example shown in FIG. 4, the subject matter node (shown by a circle node) is shown in the left side. The multiple cause nodes (shown by square nodes) are aligned in the vertical direction on the right side of the subject matter node. The multiple solution nodes (shown by hexagonal nodes) are shown on the right side of the cause nodes. That is to say, in the example shown in FIG. 4, the nodes of the facets are sequentially arranged from the left side to the right side based on the relationship regarding the time sequences of the facets.

Besides the example shown in FIG. 4, the subject matter node may be arranged in a central area of the drawing space. The cause nodes may be arranged around the subject matter node, and the solution nodes may be arranged in the outer periphery of the cause nodes. Further, the nodes may be arranged based on another rule, e.g. based on the number of edges linked to each node.

The graph shown in FIG. 4 shows the subject matter facet "Track Short Circuit" based on the analysis results of the accident report of a railroad as the subject documents. In the example shown in FIG. 4, the node labeled with "Track Short Circuit" is arranged as the subject matter node. The cause nodes labeled with "Intervention", "Contact", "Other broken", "Broken rail", and "Rail bond disengagement" are linked with the node "Track Short Circuit" via the edges. The solution nodes labeled with "Partial replacement of turnout", "Replacement of insulator", "Replacement of rail", "Attachment of rail bond", and "Attachment of joint board" are linked with the cause nodes via the edges.

Since multiple solutions may be applicable to a single cause, a single cause node may be linked with multiple solution nodes via the edges. For example, in the graph shown in FIG. 4, the cause node "Broken rail" is linked with the solution nodes "Replacement of rail", "Attachment of rail bond" and "Attachment of joint board" via the edges.

Since a single solution may be applicable to multiple causes, multiple cause nodes may be linked with a single solution node. For example, in the graph shown in FIG. 4, the cause nodes "Other broken" and "Broken rail" are linked with the solution node "Replacement of rail" via the edges.

As mentioned above, multiple words with different expressions may be extracted as a single facet in the present embodiment. That is to say, in the graph drawn by the draw unit 170, multiple words with different expressions may be associated with a single node. Further, in the shown example, facet information is shown with the nodes. The term "facet information" will be used to refer to information on the words classified (extracted) as a single facet. In the shown example, the facet information includes expressions (words) appearing in the subject documents and the number of appearances of each expression in the subject documents. The facet information may be placed near the corresponding node.

For example, the expressions (words) extracted as the cause facet corresponding to the node "Broken rail" are "Broken rail", "Rail crack", and "Rail breakage". In the graph shown in FIG. 4, these expressions and the number of their appearances are indicated as "Broken rail: 31", "Rail crack: 28", "Rail breakage: 18", which are the facet information placed near the node "Broken rail". More specifically, this facet information indicates that the words "Broken rail" appear 31 times, the words "Rail crack" appear 28 times, and the words "Rail breakage" appear 18 times in all subject documents. These words are extracted as the same cause facet to be shown with the node "Broken rail".

Similar to the node "Broken rail", as the cause facet corresponding to the node "Intervention", the words such as "Intervention of Piece of iron", "Intervention of Iron powder", "Intervention of Foreign substance", and "Intervention of Brake shoe" may be extracted as the keywords. In the graph shown in FIG. 4, the items "Piece of iron: 59", "Iron powder: 19", "Foreign substance: 18", "Brake shoe: 5" are shown with the node "Intervention". Note that these items may be arranged in an order of the number of appearances of the words (keywords). The words with the highest number of appearances among the words linked to the same node may be indicated in bold to distinguish from the other words.

As explained above referring to FIG. 2, the descriptions other than the facets included in the subject documents are associated with the facets based on the time (time axes) of the text. These descriptions are extracted as sequences of the text between the facets by the sequence rule analysis unit 150. In the present embodiment, these sequences of the text are shown near the corresponding edge as information on the linkage between the facets.

For example, it is assumed that the keyword "Track Short Circuit" is extracted as the subject matter facet and the keyword "Broken rail" is extracted as the cause facet from certain subject documents. Further, from the certain subject documents, other sequences are assumed to be extracted, such as "Investigation"→"Abnormality not found", and "Investigation"→"Insulating joint". In the graph shown in FIG. 4, the sequences and the confidence of the sequences are shown near the edge between the node "Track Short Circuit" and the node "Broken rail". More specifically, in the certain subject documents, the sequence "Investigation-"→"Abnormality not found" appears at the confidence of 0.4, and the sequence "Investigation"→"Insulating joint" appears at the confidence of 0.3. Note that the sequences are arranged in the order of confidence in the example shown in FIG. 4.

As another example, excluded words may be shown on a predetermined position in the drawing space where the graph is drawn, independently of the nodes or the edges of the facets. Note that the excluded words may refer to a word or words which are excluded from the subjects of analysis by the sequence rule analysis unit 150 for specific reasons. The specific reasons may be a high appearance rate (frequency) of the words in the time axes over all subject documents, for example.

The output unit 180 outputs the graph drawn by the draw unit 170, for example on a display or a medium such as a paper sheet.

Figure 5:
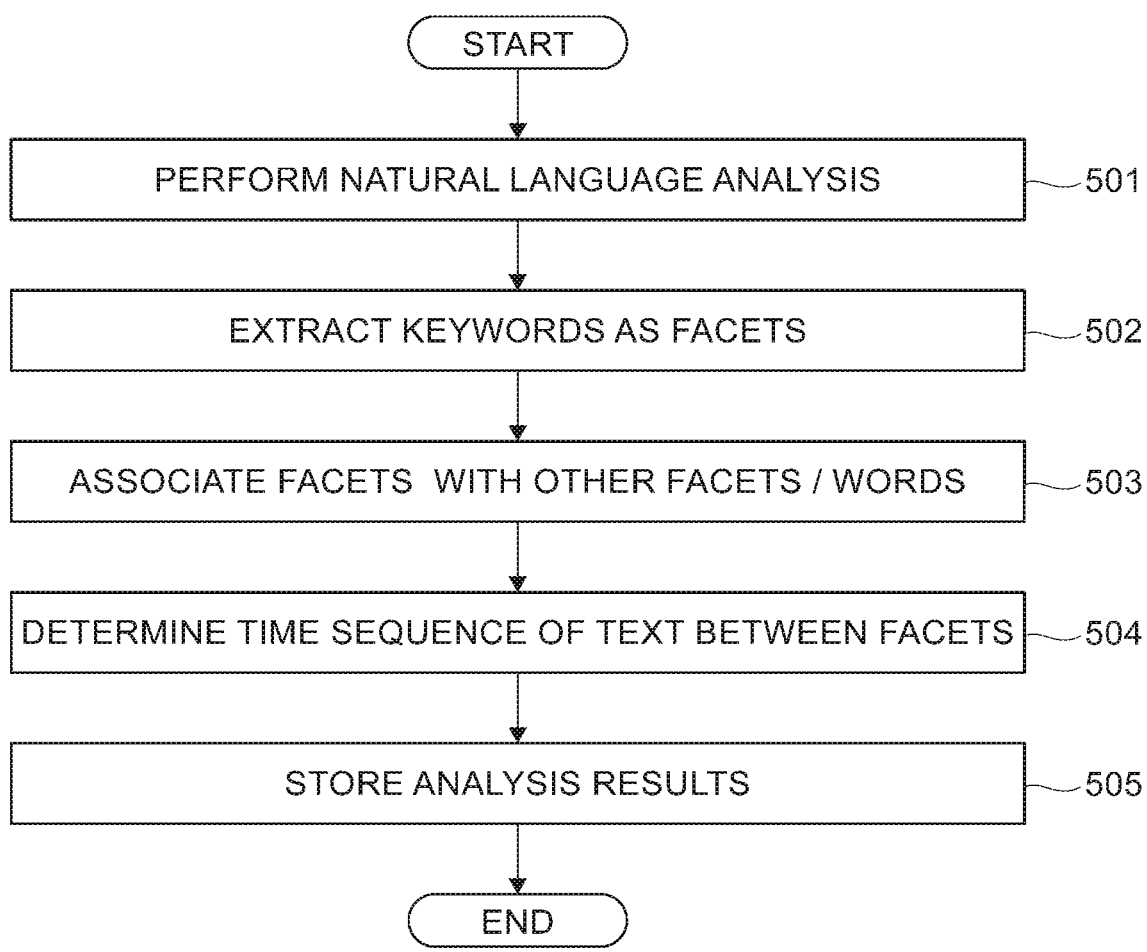
FIG. 5 is a flowchart of an analysis process on the subject documents by the text analysis unit.

FIG. 5 is a flowchart of an analysis process on the subject documents by the text analysis unit 130. The text analysis unit 130 first performs a natural language analysis processing (step 501). Any existing natural language analysis processing, such as a morpheme analysis, a syntax analysis, a semantic analysis, or a facet analysis may be applicable to this analysis processing.

The text analysis unit 130 then performs a facet analysis process. In the facet analysis process, the text analysis unit 130 extracts predetermined words (keywords) as the facets from words obtained in the natural language analysis processing (step 502). The text analysis unit 130 then associates (links) the extracted words (facets) with each other, and also links each facet and the words other than the facets based on individual positions of the words within the text of the subject documents (step 503).

The text analysis unit 130 then determines the time sequence of the text (sentences) between the facets based on the linkage of the facets and the other words (step 504). In this process, the text described between the words (keywords) extracted as the facets in the facet analysis process is sorted into groups by time axis.

The text analysis unit 130 then stores the words sorted by document ID and time axis in the first result storage unit 140 as the analysis results (step 505).

Figure 6:
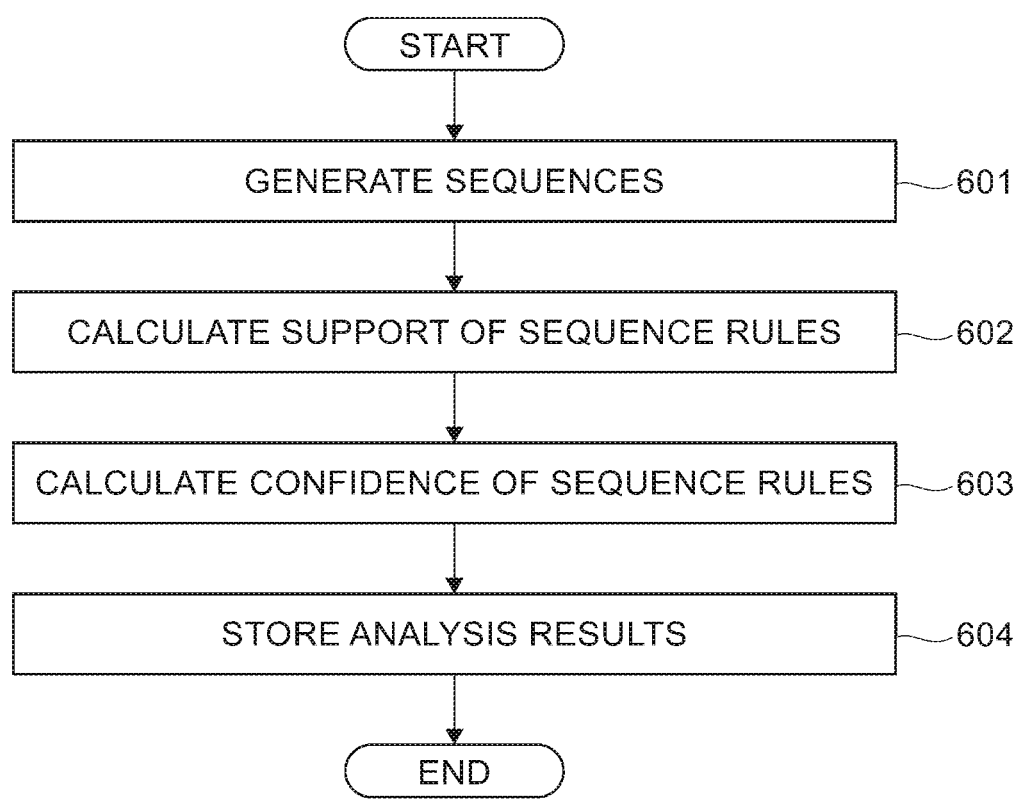
FIG. 6 is a flowchart of an analysis process on the sequence rules by the sequence rule analysis unit.

FIG. 6 is a flowchart of an analysis process on the sequence rules by the sequence rule analysis unit 150. The sequence rule analysis unit 150 first generates sequences according to the sorting by time axis based on the analysis results of the subject documents stored in the first result storage unit 140 (step 601).

The sequence rule analysis unit 150 then calculates, based on the obtained sequences, the support of the sequence rules (step 602), and the confidence of the sequence rules (step 603). As mentioned above, the sequence rule analysis unit 150 may calculate the confidence of the sequence rules only as to those exceeding the threshold.

The sequence rule analysis unit 150 then stores the sequences and the information on the sequence rules sorted by document ID and time axis in the second result storage unit 160 as the analysis results (step 604).

Figure 7:
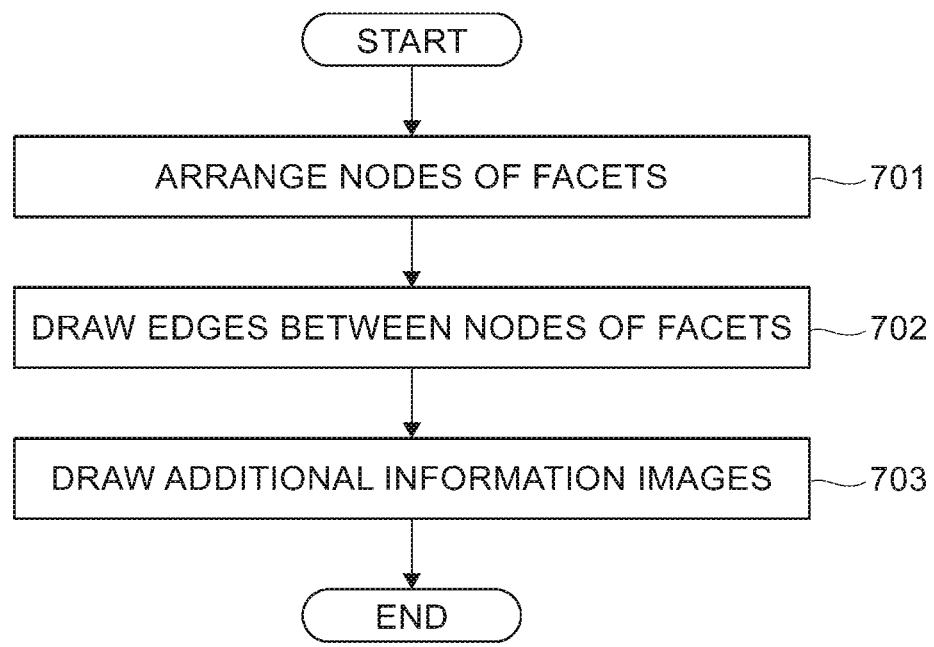
FIG. 7 is a flowchart of an output process by the draw unit.

FIG. 7 is a flowchart of an output process by the draw unit 170. The draw unit 170 first arranges the nodes of the facets in the drawing space based on the information on the facets, which is obtained from the analysis results by the text analysis unit 130 (step 701). For example, the facets may be arranged along the time sequence of the facets.

The draw unit 170 then draws edges between two nodes of the facets according to the time sequence of the facets (step 702). As mentioned above, in the analysis results of the multiple subject documents, multiple facets may lead to a single facet and a single facet may lead to multiple facets. Accordingly, edges may be drawn from a single facet to other multiple facets, or from multiple facets to a single facet.

Further, the draw unit 170 optionally draws additional information images (step 703). More specifically, if there is any additional information on the facets, the draw unit 170 optionally adds images indicating the additional information to the nodes of the corresponding facets. If there is any sequence of words associated with the facets, the draw unit 170 also optionally places images indicating such sequence near the edge between the nodes of the corresponding facets.

Figure 8:
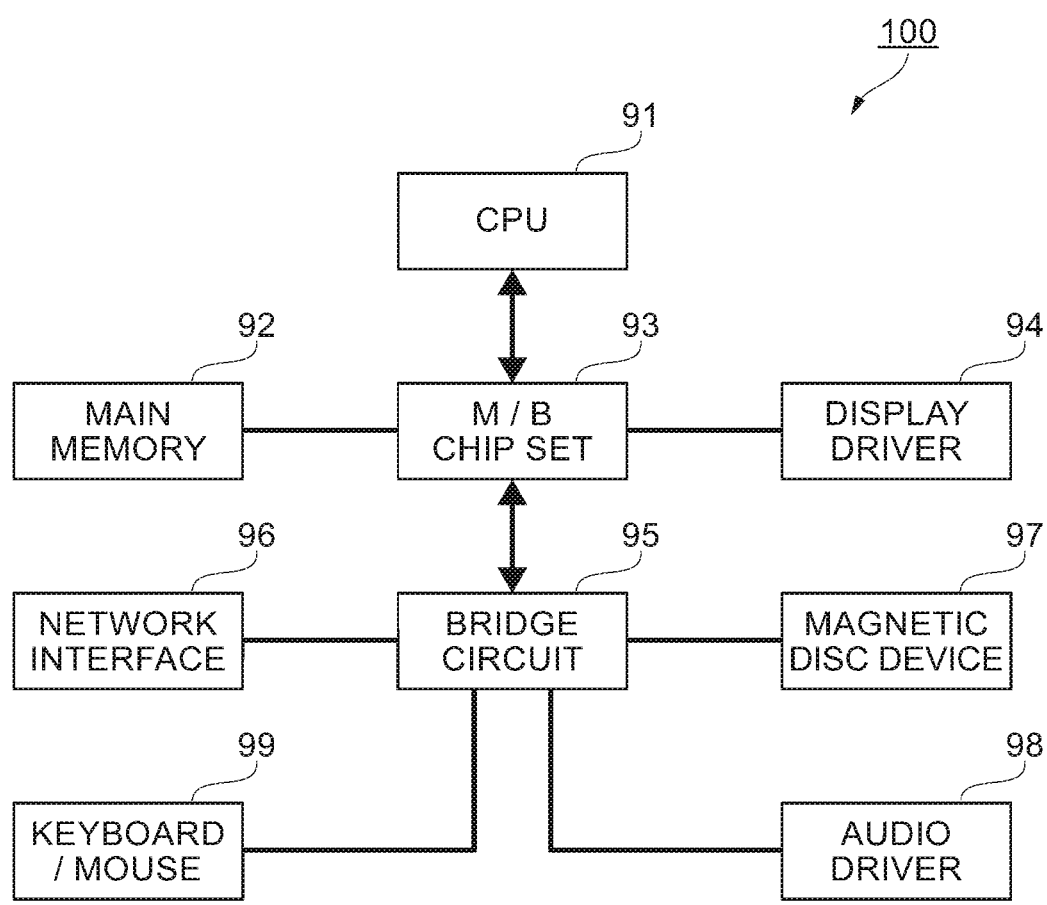
FIG. 8 is an example of a hardware configuration of the document analysis device in the exemplary embodiment.

Referring to FIG. 8, there is shown an example of a hardware configuration of the document analysis device 100 in the exemplary embodiments. As shown in the figure, the document analysis device 100 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 8, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

Note that the main memory 92 and magnetic disk device 97 may function as the document storage unit 110. The main memory 92 and the magnetic disk device 97 may also function as the facet definition storage unit 120. The CPU 91 executing a program stored in the main memory 92 may function as the text analysis unit 130. The main memory 92 and the magnetic disk device 97 may also function as the first result storage unit 140. The CPU 91 executing a program stored in the main memory 92 may also function as the sequence rule analysis unit 150. The main memory 92 and the magnetic disk device 97 may also function as the second result storage unit 160. The CPU 91 executing a program stored in the main memory 92 may also function as the draw unit 170. Further, in the storage area of the main memory 92, the drawing space where the draw unit 170 draws the graph is defined. The display driver 94 may function as the output unit 180, if the graph is shown on the display. The network interface 96 may function as the output unit 180, if the graph is output to an external device such as a printer.

The above function units may be configured by a single computer. Alternatively, the above function units may be distributed in multiple computers. Further, a part of the function may be performed by servers on the network.

More specifically, at least one of the functions of the text analysis unit 130 and the sequence rule analysis unit 150 may be performed outside the document analysis device 100.

Figure 9:
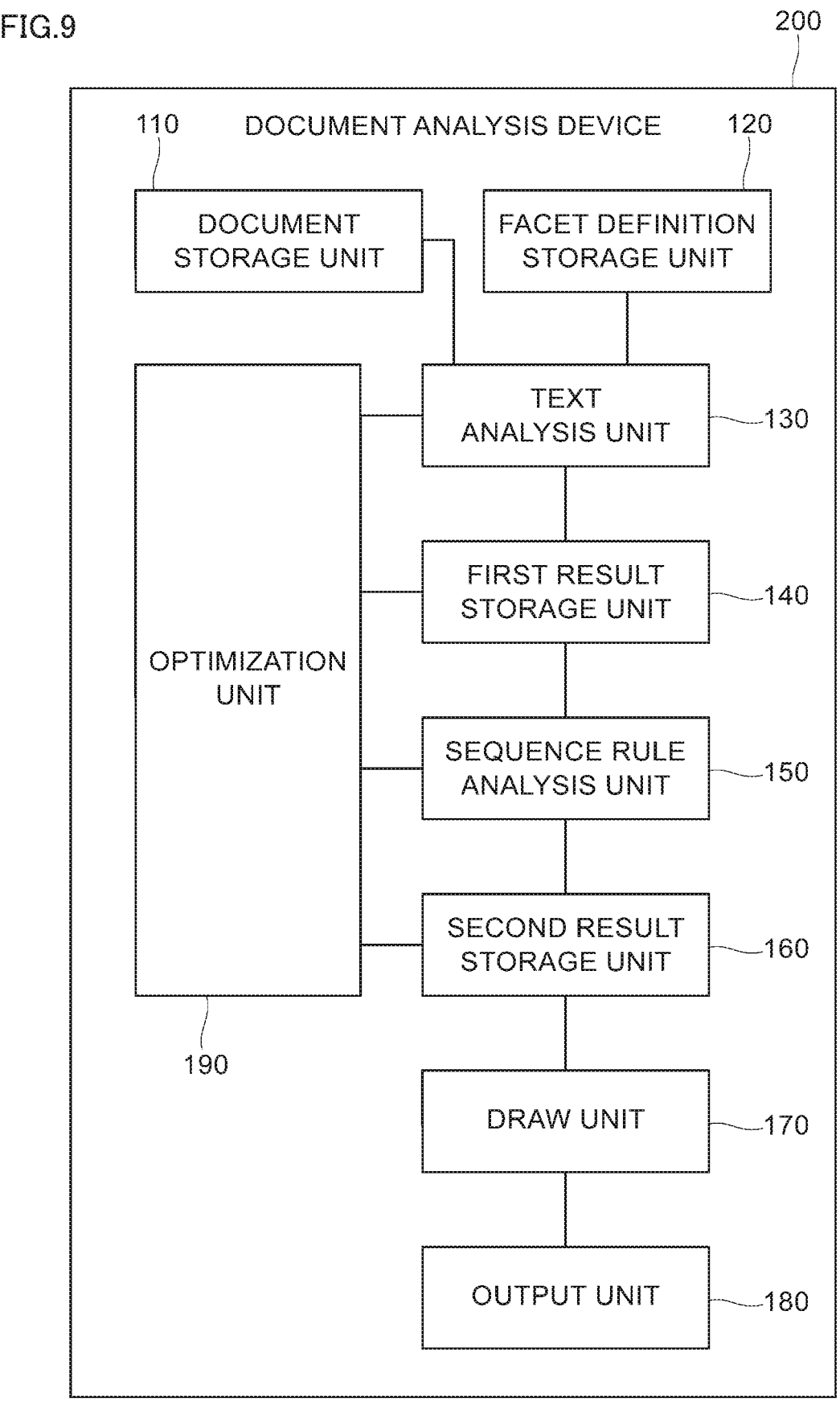
FIG. 9 is a block diagram of a document analysis device according to another embodiment of the present invention.

FIG. 9 is a block diagram of a document analysis device 200 according to another embodiment of the present invention. As shown in FIG. 9, the document analysis device 200 may include an optimization unit 190 besides the units of the document analysis device 100 shown in FIG. 1.

The optimization unit 190 may optimize the analysis by the text analysis unit 130 and the sequence rule analysis unit 150. More specifically, the optimization unit 190 may optimize the analysis based on the analysis results of the text analysis unit 130 stored in the first result storage unit 140, and the analysis results of the sequence rule analysis unit 150 stored in the second result storage unit 160.

For example, the optimization unit 190 may change a criterion for the text analysis unit 130 to handle words with different expressions as synonymous words, based on the number of appearances of the words in the subject documents. In another example, the optimization unit 190 may change a criterion for the text analysis unit 130 to extract words with different expressions as a single facet, based on deviations of the facets and the words in the analysis results of the sequence rule analysis unit 150. In still another example, the optimization unit 190 may change a criterion for the sequence rule analysis unit 150 to exclude words appearing in common in all subject documents.

The document analysis device 200 may be constituted according to the hardware configuration as shown in FIG. 8. The CPU 91 executing a program stored in the main memory 92 may function as the optimization unit 190.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
receiving a plurality of electronic documents;
extracting keywords from the plurality of electronic documents;
generating, for each of the plurality of electronic documents, a respective time sequence by performing natural language processing, based upon a sequence of verbs in a respective electronic document, to set the time sequence for the respective electronic document;
generating, using the keywords and based upon the time sequences, a plurality of facets of different types including at least one of each of:
a subject matter facet,
a cause facet, and
a solution facet;
electronically displaying the plurality of sequences using the plurality of facets as nodes connected by edges, wherein
an edge between two different types of facets represents a relationship between the two different types of facets and is identified from the time sequences,
the nodes are displayed in a specific direction based upon the time sequences,
the different types of facets are visually distinguishable from one another, and
the cause facet is linked to the subject matter facet and occurs after the subject matter facet in the respective electronic document.

2. The method of claim 1, wherein
keywords associated with a particular facet are displayed adjacent the particular facet.

3. The method of claim 2, wherein
a number of appearances in which a particular keyword was found in the plurality of electronic documents is displayed adjacent the particular keyword.

4. The method of claim 2, wherein
the keywords associated with a particular facet are visually ranked based upon numbers of appearances in which the keywords were found in the plurality of electronic documents.

5. The method of claim 1, wherein
a particular cause facet includes edges connecting the particular cause facet to a plurality of solution facets.

6. The method of claim 1, wherein
a particular solution facet includes edges connecting the particular solution facet to a plurality of cause facets.

7. The method of claim 1, wherein
each of the plurality of sequences includes a display of a calculated confidence level associated therewith.

8. The method of claim 1, wherein
a particular node represents a plurality of related facets, and
a size of the particular node is based upon a number of appearances of the plurality of related facets in the plurality of electronic documents.

9. A computer hardware system, comprising:
a hardware processor configured to initiate the following executable operations:
receiving a plurality of electronic documents;
extracting keywords from the plurality of electronic documents;
generating, for each of the plurality of electronic documents, a respective time sequence by performing natural language processing, based upon a sequence of verbs in a respective electronic document, to set the time sequence for the respective electronic document;
generating, using the keywords and based upon the time sequences, a plurality of facets of different types including at least one of each of:
a subject matter facet,
a cause facet, and
a solution facet;
electronically displaying the plurality of sequences using the plurality of facets as nodes connected by edges, wherein
an edge between two different types of facets represents a relationship between the two different types of facets and is identified from the time sequences,
the nodes are displayed in a specific direction based upon the time sequences,
the different types of facets are visually distinguishable from one another, and
the cause facet is linked to the subject matter facet and occurs after the subject matter facet in the respective electronic document.

10. The system of claim 9, wherein
keywords associated with a particular facet are displayed adjacent the particular facet.

11. The system of claim 10, wherein
a number of appearances in which a particular keyword was found in the plurality of electronic documents is displayed adjacent the particular keyword.

12. The system of claim 10, wherein
the keywords associated with a particular facet are visually ranked based upon numbers of appearances in which the keywords were found in the plurality of electronic documents.

13. The system of claim 9, wherein
a particular cause facet includes edges connecting the particular cause facet to a plurality of solution facets.

14. The system of claim 9, wherein
a particular solution facet includes edges connecting the particular solution facet to a plurality of cause facets.

15. The system of claim 9, wherein
each of the plurality of sequences includes a display of a calculated confidence level associated therewith.

16. The system of claim 9, wherein
a particular node represents a plurality of related facets, and
a size of the particular node is based upon a number of appearances of the plurality of related facets in the plurality of electronic documents.

17. A computer program product, comprising:
a computer readable storage medium having stored therein program instructions,
the program instructions, which when executed by a computer hardware system, cause the computer hardware to perform:
  receiving a plurality of electronic documents;
  extracting keywords from the plurality of electronic documents;
  generating, for each of the plurality of electronic documents, a respective time sequence by performing natural language processing, based upon a sequence of verbs in a respective electronic document, to set the time sequence for the respective electronic document;
  generating, using the keywords and based upon the time sequences, a plurality of facets of different types including at least one of each of:
    a subject matter facet,
    a cause facet, and
    a solution facet;
  electronically displaying the plurality of sequences using the plurality of facets as nodes connected by edges, wherein
an edge between two different types of particular facets represents a relationship between the two different types of particular facets and is identified from the time sequences,
the nodes are displayed in a specific direction based upon the time sequences,
the different types of facets are visually distinguishable from one another, and
the cause facet is linked to the subject matter facet and occurs after the subject matter facet in the respective electronic document.

18. The computer program product of claim 17, wherein
keywords associated with a particular facet are displayed adjacent the particular facet,
a number of appearances in which a particular keyword was found in the plurality of electronic documents is displayed adjacent the particular keyword, and
the keywords associated with a particular facet are visually ranked based upon numbers of appearances in which the keywords were found in the plurality of electronic documents.

19. The computer program product of claim 17, wherein
a particular cause facet includes edges connecting the particular cause facet to a plurality of solution facets, and
a particular solution facet includes edges connecting the particular solution facet to a plurality of cause facets.

20. The computer program product of claim 17, wherein
each of the plurality of sequences includes a display of a calculated confidence level associated therewith.

* * * * *